United States Patent [19]

Jun

[11] Patent Number: 5,497,242

[45] Date of Patent: Mar. 5, 1996

[54] WRITE CURRENT CONTROL CIRCUIT FOR AUDIO RECORDING

[75] Inventor: Tae-sun Jun, Suwon, Rep. of Korea

[73] Assignee: Samsung Electronics Co., Ltd., Kyungki-do, Rep. of Korea

[21] Appl. No.: 164,574

[22] Filed: Dec. 10, 1993

Related U.S. Application Data

[63] Continuation-in-part of Ser. No. 902,377, Jun. 23, 1992, abandoned.

[30] Foreign Application Priority Data

Jul. 11, 1991 [KR] Rep. of Korea ....................... 91-10624

[51] Int. Cl.⁶ ..................................................... H04N 5/782
[52] U.S. Cl. ........................... 358/341; 358/343; 358/310; 360/19.1
[58] Field of Search ...................................... 358/341, 343, 358/328, 310, 340, 335; 360/19.1, 18; H04N 5/782

[56] References Cited

U.S. PATENT DOCUMENTS

| 3,571,494 | 3/1971 | Law ............................................ 358/323 |
| 4,613,912 | 9/1986 | Shibata et al. ............................ 358/341 |
| 4,679,097 | 7/1989 | Tomita .................................... 360/19.1 |
| 5,053,890 | 10/1991 | Namiki ................................... 358/343 |
| 5,063,452 | 11/1991 | Higurashi ................................ 358/341 |
| 5,148,329 | 9/1992 | Yamauchi et al. ..................... 360/19.1 |
| 5,396,372 | 3/1995 | Itoh et al. .............................. 360/19.1 |

FOREIGN PATENT DOCUMENTS 0208769  9/1987  Japan ............................ H04N 5/782

Primary Examiner—Tommy P. Chin
Assistant Examiner—Huy Nguyen
Attorney, Agent, or Firm—Sughrue, Mion, Zinn, Macpeak & Seas

[57] ABSTRACT

A write control circuit for audio signals in a video tape recorder having an audio signal processor for signal processing in order to record a received audio signal and a video signal processor for signal processing in order to record a received video signal includes a mode setting device for setting an exclusive audio recording mode, under the control of a user, and a bias control circuit for adjusting an audio recording signal output from the audio signal processor to be at it's optimum level when recording according to the characteristic of a recording head in the exclusive audio recording mode. The write control circuit improves the signal-to-noise ratio during the exclusive audio recording mode of operation by muting and recording an applied video signal while using the optimum bias current for a recording head.

18 Claims, 2 Drawing Sheets

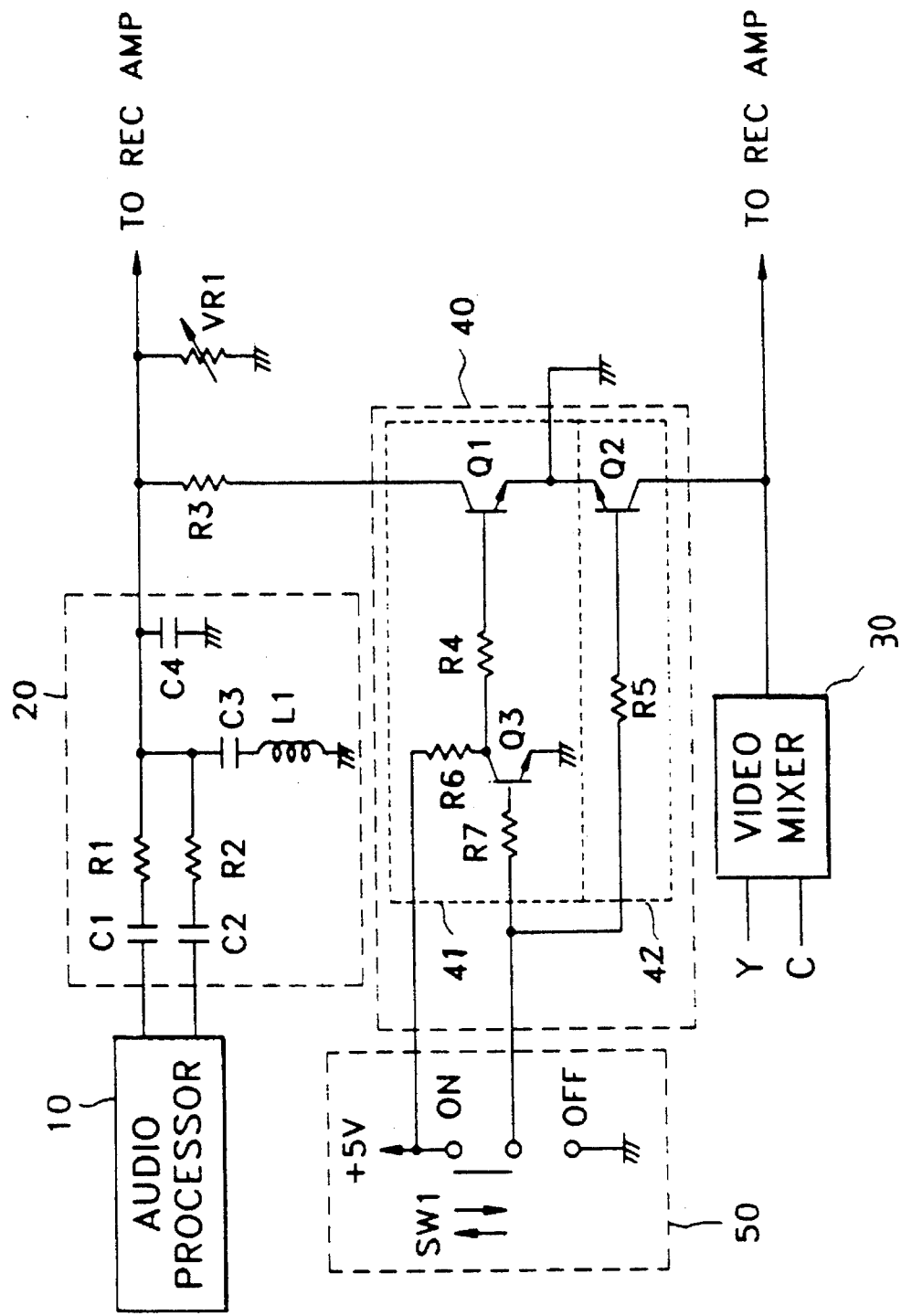

WRITE CURRENT CONTROL CIRCUIT FOR AUDIO RECORDING

This application is a continuation-in-part of application Ser. No. 902,377, filed on Jun. 23, 1992, abandoned.

The present invention relates to a write control circuit for an audio signal in a video tape recorder (VTR), and, more particularly, to a circuit for setting the optimum level of write current during exclusive audio recording in a hi-fi VTR.

BACKGROUND OF THE INVENTION

A conventional VTR records and reproduces video and audio signals using respective dedicated tracks. On the other hand, a hi-fi VTR records and reproduces video and audio signals by superimposing these signals on one track. As compared with a conventional video signal, the superposition recording mode employed in the hi-fi VTR does an in-depth recording of the audio signal. More specifically, the audio signal is first recorded on the track and then the video signal is superimposed thereon. This recording sequence is due to a difference in frequency between the video and audio signals. The frequency of the video signal is about 3.4–4 MHz, which is higher than that of the audio signal, which is either 1.3 MHz or 1.7 MHz. The superimposing of signals during the recording mode substantially differentiates a hi-fi VTR from a conventional VTR.

The hi-fi VTR experiences problems due to the recording mode characteristics described above because the video and audio signals have a relative effect on each other caused by their respective recording currents. In other words, when a video signal is superimposed on the track on which an audio signal is recorded, once the recording current increase of the video signal goes beyond a certain level, it has an effect on the magnetizing state of the audio signal on the tape so that the signal-to-noise ratio (SNR) of the reproducing output is degraded and noise occurs when listening. In contrast, once the recording current increase of the audio signal goes beyond a certain level, the difference in frequency between the L-CH (1.3 MHz) and the R-CH (1.7 MHz), i.e., 400 kHz, has an effect on the color signal of the video signal, e.g., 629 kHz. Therefore, a beat occurs in the video. The mutual interference between video and audio signals as described above is well known.

FIG. 1A illustrates level variation for audio signals with 1.7 MHz (L-CH) and 1.3 MHz (R-CH) bandwidths for the exemplary case where the write current of the video signal gradually increases. In other words, when the reproducing output of the audio signals has been set so that it can be obtained at the maximum level and the audio and video signals are superimposed as described above, the curves in FIG. 1A illustrate audio and video signals which represent respective reproducing levels at their recording currents. Here, the reproducing output is an FM envelope of a reproduced signal. The curve (a) in FIG. 1A represents a video signal having a bandwidth of approximately 4 MHz as previously described, while curves (b) and (c) represent the above-mentioned audio signals, i.e., curve (b) represents the left channel (L-CH) having a bandwidth of approximately 1.3 MHz while curve (c) represents the right channel (R-CH) having a bandwidth of approximately 1.7 MHz.

As shown in FIG. 1A, when the recording current of a video signal goes higher than point A0, the reproducing level of the video signal increases to some extent, while the reproducing level of the audio signals decreases. In this manner, when the reproducing level of an audio signal decreases, the SNR of the audio signal is degraded and noise occurs, as described above.

Conventionally, to improve the above-mentioned drawback, that is, the mutual interference due to the magnitude of the write current between an audio and a video signal, the write current of an audio signal has been limited. In other words, the A0 point, as shown in FIG. 1A, has been established as an optimum point, at which mutual interference between the audio and video signals does not occur, and then the write current applied to an audio head is adjusted so as to be applied at point A0 or lower.

This limitation on A0 prevents the occurrence of a beat in the video signal, but causes the dynamic range for the audio signal to be reduced, thereby degrading the audio reproduction level. More particularly, the maximum recording current of the audio signal in an exclusive audio write control operation is applied with respect to the set point, the point A0 mentioned above, resulting in the optimum reproducing level for listening being unobtainable. FIG. 1B, which shows the ratio between a reproducing level and a write control operation, illustrates the level of the reproducing output of the audio signal increases depending on the increase of its write current, but its reproducing output is limited because its write current has been limited with respect to the set point, as mentioned above.

Attenuation of the reproducing output of a video signal in FIG. 1A is due to the loss of thickness in a magnetic recording medium (or tape) as its write current increases in succession. In other words, the magnetizing state varies with respect to the recording signal. When the video write current increases beyond saturation, since the magnetizing state of the magnetic recording medium is supersaturated, the reproducing output of the video signal is attenuated due to the loss of thickness in the magnetic recording medium.

It will be appreciated that the write current is always constrained by the set point, even when, as in an exclusive audio recording mode, a corresponding video signal is not received or, if received, is not to be recorded. Thus, the write current is constrained by the set point even when it is undesirable to do so as it will decrease the dynamic range of the signal of interest, the audio signal, being recorded.

Another problem associated with the conventional hi-fi VTR device is that no exclusive audio recording mode is possible for when a signal source applied for recording is supplied via an internally installed tuner.

SUMMARY OF THE INVENTION

Accordingly, it is a primary object of the present invention to provide a write control circuit for audio signals which is capable of adjusting an audio write current to the optimum level to thereby match the characteristics of a head in an exclusive audio recording mode of operation in a VTR.

It is another object of the present invention to provide a write control circuit for audio signals in a hi-fi VTR for muting a video signal and allowing the write current of the audio signal to be supplied at the optimum level in an exclusive audio recording mode of operation to thereby obtain a higher signal-to-noise ratio.

To achieve the above objects of the present invention, there is provided a write control circuit for audio signals in a VTR having an audio signal processor for processing in order to record a received audio signal and a video signal processor for processing in order to record a received video signal, which comprises:

a mode setting device for setting up an exclusive audio recording mode under the control of a user; and a bias control circuit for adjusting an audio write signal output from the audio signal processor when an exclusive audio recording mode has been set up by the mode setting device to permit use of the optimum level for recording according to recording head characteristics.

In addition, the bias control circuit further comprises a muting device for muting an output signal from the video signal processor if and when an exclusive audio recording mode has been set up by the mode setting device, wherein the muting device is operatively connected between the mode setting device and the video signal processor.

BRIEF DESCRIPTION OF THE DRAWINGS

The above objects and other advantages of the present invention will become more apparent by describing the preferred embodiment with reference to the attached drawings, in which:

FIG. 2 illustrates circuitry according to a preferred embodiment of the present invention.

DETAILED DESCRIPTION OF PREFERRED EMBODIMENTS

Figure 1A:
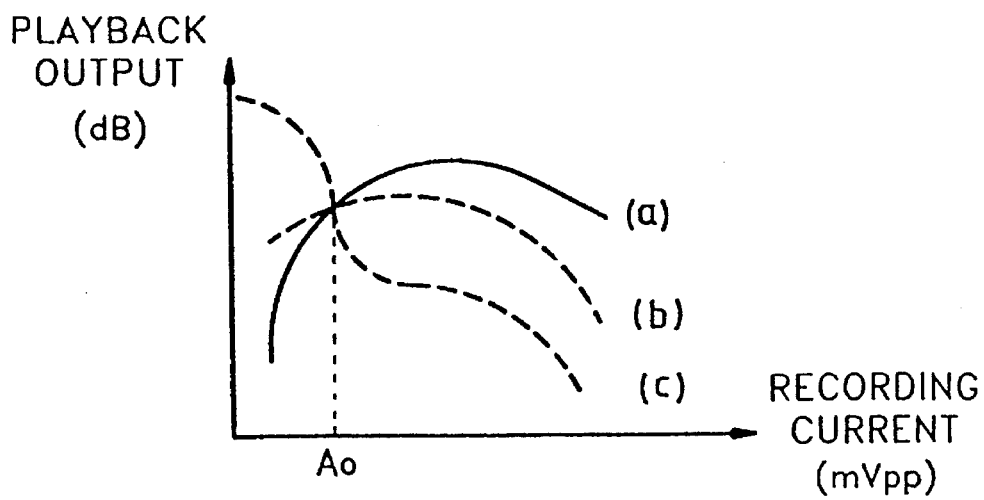
FIGS. 1A and 1B are graphical representations showing the respective write current to reproducing output ratios for an audio signal and a video signal in a hi-fi VTR.
Figure 1B:
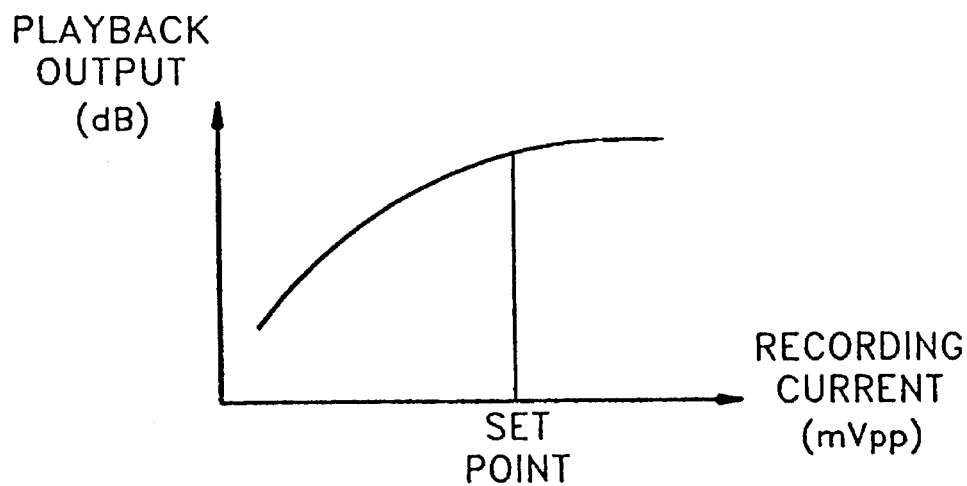

A preferred embodiment of the present invention will now be described with respect to FIG. 2, wherein an example of the circuit employed in a hi-fi VTR, which processes an audio signal as a stereo signal and a video signal as a composite video signal, is illustrated.

According to FIG. 2, the circuitry comprises: an audio signal processor 10 for processing a received audio signal in such a mode as, for example, FM modulation, to output each signal of two channels; an audio mixer 20 for mixing the output signals of the channels from the audio signal processor 10 to generate a mixed signal to an audio recording amplifier (not shown); a video mixer 30 for receiving the luminance and color signals corresponding to a predetermined video signal and mixing them to make a single, mixed video signal, then providing the mixed video signal to a video recording amplifier (not shown). The circuitry further includes a bias control circuit 40 for adjusting the output signal from audio mixer 20 to it's optimum level so as to match a predetermined recording head during an exclusive audio recording mode and muting the output signal of video mixer 30 and a mode switch 50 for selecting an exclusive audio recording mode under the control of a user. In this embodiment, the audio signal processor 10 may advantageously include audio mixer 20 for recording and processing an audio signal, while video mixer 30 may advantageously include the video signal processor (not shown) for processing the video signal.

Figure 3:
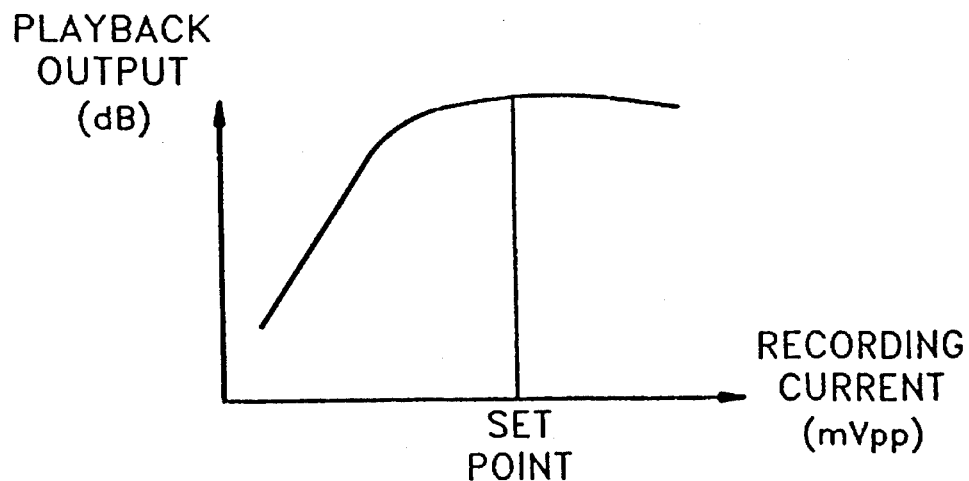
FIG. 3 shows the ratio of write current to reproducing output in exclusive audio recording mode according to the invention.

The operation of the circuitry shown in FIG. 2 will be described in detail with reference to FIG. 3. Detailed explanation of the audio processor 10 and video mixer 30, each of which may advantageously include any commercially available, known circuit suitable for modulating and processing respective audio and video signals applied thereto, is omitted in the interest of brevity. In the present embodiment, the audio signal preferably is a stereo signal and the video signal advantageously contains both the luminance and color signals. It will be appreciated that the audio signal may be a monaural signal and that the video signal may be simply a luminance signal i.e., a black and white video signal.

The mode switch SW1 advantageously selects an exclusive audio recording mode and preferably is a slide switch. If it is embodied by a slide switch, then its center terminal is connected to supply an output signal. In the present embodiment, once the mode switch SW1 is positioned to supply a +5 V supply voltage to its center terminal, then the hi-fi VTR will be set to the exclusive audio recording mode (turned-on state), and while positioned to ground its center terminal, then it is set to the common mode (turned-off state).

When recording a signal in the exclusive audio recording mode, the bias control circuit 40 mutes the video signal and allows an audio signal at its optimum level to be supplied to the audio recording head. The bias control circuit 40 includes a first switch 41 acting as a first switching means and operatively connected between the center terminal of the mode switch SW1 and the output of the audio mixer 20, and a second switch 42 acting as second switching means and connected between the center terminal of the mode switch SW1 and video mixer 30.

The first switch 41, which switches in conjunction with the mode switch SW1, is switched off when the mode switch SW1 is switched on, and preferably acts as path control means for forming a path capable of controlling the audio recording current, i.e., maintaining the output of the audio mixer 20 at an optimum level suitable for the recording head.

The second switch 42, which switches in conjunction with the mode switch SW1, is on when the mode switch SW1 is switched on, so as to operate as a muting device for muting a video recording signal, i.e., the output of the video mixer 30.

The second switch 42 is embodied by an npn-type switching transistor Q2 whose base is connected to a resistor R5 acting as an over-current protection device. The switch 42 is switched on to mute the output from video mixer 30 when the mode switch SW1 is switched on. Conversely, when the mode switch SW1 is switched off, a low voltage is applied to the base of the transistor Q2 so as to switch it off, thereby resulting in no effect on the output signal from video mixer 30.

Similarly, the first switch 41 includes an npn-type transistor Q3, whose collection is connected to the supply voltage +5 V through a resistor R6, and a transistor Q1 whose base is connected to the collector of the transistor Q3 through a resistor R4, which also functions as an overcurrent protection means. Accordingly, when the mode switch SW1 is switched on, the transistor Q3 is switched on and a low voltage is applied to the base of the transistor Q1. Therefore, the transistor Q1 is switched off so as to enable control of the recording current of the audio signal via a variable resistor VR1.

On the other hand, when the mode switch SW1 is switched off, the transistor Q3 is switched off and a high voltage is applied to the base of the transistor Q1. Accordingly, the transistor Q1 is switched on, connecting the variable resistor VR1 and resistor R3 in parallel, so as to decrease the audio write current. Therefore, the transistor Q3 acts as means for converting the output signal from mode switch SW1, while resistor R3 serves as a current limiting resistor.

A variable resistor VR1, functioning as a varying means for freely varying, before recording, the audio recording signal which is the output of the audio mixer 20, is connected to the output of the audio mixer 20, as described above. The variable resistor VR1 controls the audio recording current to the optimum level in conjunction with the first switch 41.

On this occasion, the audio write current, i.e., the output of the audio mixer 20, is fed to the recording head at its optimum level. When the audio signal is reproduced after being recorded, the signal-to-noise ratio is thereby improved as much as 10 dB or more. More specifically, a reproducing level becomes the optimum level, as shown in FIG. 3, which is a graphical presentation of a reproducing output to write current ratio with respect to an audio signal during exclusive audio write control operation according to this embodiment.

The audio mixer 20 provides a means for receiving stereo audio signals of the respective R and L channels each of which are modulated onto a different carrier signal by audio processor 10, and then for mixing the signals. In an exemplary configuration, a capacitor C1 and a resistor R1 are connected in series to a node in parallel with a capacitor C2 and a resistor R2, which are also connected in series, so as to mix the stereo audio signals of the R and L channels. Thereafter, any high-frequency component which might be included in the audio signal thus mixed is removed by capacitor C4, which is connected in parallel with a series connected capacitor C3 and inductor L1, all of which are connected between ground and the above-discussed node. The resistors R1 and R2 satisfy a specific relationship between them, i.e., R1 ) R2, because before mixing, the R channel is set as much as 8–10 dB higher than the L channel, as explained above.

As disclosed hereinabove, the present invention has, when applied to a VTR and particularly to a hi-fi VTR, an advantage whereby the optimum reproducing level of a recorded audio signal can advantageously be obtained when reproducing the signal by muting the video signal and simultaneously adjusting the audio signal to its optimum level, which level is suitable for a recording head in an exclusive audio recording mode.

The present invention is not restricted to the named elements embodied in the foregoing embodiment. Rather, the invention extends to any embodiments having the features disclosed in this specification (including the accompanying claims, abstract and drawings). The previously mentioned transistors may advantageously be either field-effect transistors or analog switches and the resistors may advantageously be replaced with other passive elements.

What is claimed is:

1. A write control circuit for audio signals in a video recorder having an audio signal processor for signal processing a received audio signal in order to record the received audio signal and a video signal processor for signal processing a received video signal in order to record the received video signal, said circuit having a normal recording mode in which both the received audio and video signals are simultaneously recorded on a recording medium and the level of the received audio signal is limited to a predetermined level for recording on the recording medium to prevent mutual interference between the audio and video signals, and an exclusive audio recording mode in which only the received audio signal is recorded on the recording medium, said circuit comprising:

mode setting means for setting one of the normal recording mode and the exclusive audio recording mode under control of a user; and a bias control circuit for adjusting the level of the received audio signal output from said audio signal processor in response to the normal recording mode setting so that the level of the received audio signal is no larger than the predetermined level, and for allowing the received audio signal to reach an optimum level which is greater than the predetermined level in response to the exclusive audio recording mode setting.

2. The write control circuit of claim 1, wherein said bias control circuit includes muting means for muting the received video signal output from said video signal processor when the exclusive audio recording mode has been set by said mode setting means, said muting means being operatively connected between said mode setting means and said video signal processor.

3. The write control circuit of claim 1, wherein the output of said audio signal processor is connected to a resistor which is switchably connected to a ground potential, and wherein said bias control circuit comprises at least one switching means for switchably connecting said resistor to the ground potential, said bias control circuit switching off connection between said resistor and the ground potential so as to control said audio recording signal to be supplied in the optimum level to said recording head.

4. The write control circuit of claim 2, wherein the output of said audio signal processor is connected to a resistor which is switchably connected to a ground potential, and wherein said bias control circuit comprises first switching means for switchably connecting said resistor to the ground potential, said bias control circuit switching off connection between said resistor and the ground potential in only said normal recording mode, thereby controlling an audio signal output from said audio signal processor at said optimum level, and second switching means for switchably connecting the output of said video signal processor to the ground potential, thereby muting the received video signal output from said video signal processor.

5. The write control circuit of claim 4, further comprising current control means for controlling current of said audio signal output from said audio signal processor, said current control means being operatively coupled to said first switching means.

6. The write control circuit of claim 5, wherein said current control means includes signal varying means for controlling the current of said audio signal output from said audio signal processor.

7. The write control circuit of claim 4, wherein said second switching means comprises a transistor and protecting means for protecting said transistor from excess current.

8. The write control circuit of claim 5, wherein said first switching means comprises a first transistor and protecting means for protecting said first transistor from excess current.

9. The write control circuit of claim 8, wherein said first switching means comprises a second transistor for converting the output signal of said mode setting means to an input signal of said first transistor.

10. A write control circuit for audio signals in a video recorder having an audio signal processor for signal processing a received audio signal in order to record the received audio signal and a video signal processor for signal processing a received video signal in order to record the received video signal, said circuit having a normal recording mode in which both the received audio and video signals are simultaneously recorded on a recording medium and the level of the received audio signal is limited to a predetermined level for recording on the recording medium, and an exclusive audio recording mode in which only the received audio signal is recorded on the recording medium, said circuit comprising:

mode setting means for setting one of the normal recording mode and the exclusive audio recording mode under control of a user;

a bias control circuit for adjusting the received audio signal output from said audio signal processor to decrease the level of the received audio signal in the normal recording mode so that the level of the received audio signal is no larger than the predetermined level, and for adjusting the received audio signal to allow the received audio signal to reach an optimum level in said exclusive audio recording mode;

wherein said bias control circuit includes muting means for muting the received video signal output from said video signal processor when the exclusive audio recording mode has been set by said mode setting means, said muting means being operatively connected between said mode setting means and said video signal processor;

wherein the output of said audio signal processor is connected to a resistor which is switchably connected to a ground potential, and wherein said bias control circuit comprises first switching means for switchably connecting said resistor to the ground potential, said bias control circuit switching off connection between said resistor and the ground potential in said normal recording mode, thereby controlling an audio signal output from said audio signal processor at said optimum level, and second switching means for switchably connecting the output of said video signal processor to the ground potential, thereby muting the received video signal output from said video signal processor;

further comprising current control means for controlling current of said audio signal output from said audio signal processor, said current control means being operatively coupled to said first switching means;

wherein said first switching means comprises a first transistor and protecting means for protecting said first transistor from excess current; and wherein said first transistor of said first switching means is a field-effect transistor.

11. The write control circuit of claim 10, wherein said first switching means comprises a second transistor for converting the output signal of said mode setting means to an input signal of said first transistor.

12. A write control circuit for audio signals in a video recorder having an audio signal processor for signal processing a received audio signal in order to record the received audio signal and a video signal processor for signal processing a received video signal in order to record the received video signal, said circuit having a normal recording mode in which both the received audio and video signals are simultaneously recorded on a recording medium and the level of the received audio signal is limited to a predetermined level for recording on the recording medium, and an exclusive audio recording mode in which only the received audio signal is recorded on the recording medium, said circuit comprising:

mode setting means for setting one of the normal recording mode and the exclusive audio recording mode under control of a user;

a bias control circuit for adjusting the received audio signal output from said audio signal processor to decrease the level of the received audio signal in the normal recording mode so that the level of the received audio signal is no larger than the predetermined level, and for adjusting the received audio signal to allow the received audio signal to reach an optimum level in said exclusive audio recording mode;

wherein said bias control circuit includes muting means for muting the received video signal output from said video signal processor when the exclusive audio recording mode has been set by said mode setting means, said muting means being operatively connected between said mode setting means and said video signal processor;

wherein the output of said audio signal processor is connected to a resistor which is switchably connected to a ground potential, and wherein said bias control circuit comprises first switching means for switchably connecting said resistor to the ground potential, said bias control circuit switching off connection between said resistor and the ground potential in said normal recording mode, thereby controlling an audio signal output from said audio signal processor at said optimum level, and second switching means for switchably connecting the output of said video signal processor to the ground potential, thereby muting the received video signal output from said video signal processor;

wherein said second switching means comprises a transistor and means for protecting said transistor from excess current; and wherein said transistor of said second switching means is a field-effect transistor.

13. A write control circuit for audio signals for improving a signal-to-noise ratio in an exclusive audio use write mode of a hi-fi video tape recorder having an audio mixer for mixing two audio channels in stereo into a single audio signal and a video mixer for mixing luminance and chrominance signals into a single video signal, said circuit comprising:

muting means for muting said video signal output from said video mixer, said muting means being switchably connected between said video mixer and ground potential;

write current control means for controlling output current of said audio mixer being supplied to a recording head, said write current control means being connected to an output of said audio mixer;

path control means switchably connected between said write current control means and said ground potential so as to permit said write current control means to control the output current of said audio mixer; and a mode switch for controlling said muting means, when in said exclusive audio use write mode, to mute said video signal by connecting said muting means to said ground potential, and for controlling said path control means to operate in the exclusive audio use write mode by not forming a path between said write current control means and said ground potential, thereby allowing said audio signal to be supplied to said recording head without attenuation, said mode switch further controlling said path control means to form the path between said write current control means and said ground potential when the hi-fi video tape recorder is not in said exclusive audio use write mode so that the audio signal is attenuated to a predetermined level prior to being supplied to said recording head to prevent mutual interference between the audio and video signals.

14. The write control circuit of claim 13, wherein said write current control means includes signal varying means for varying the output current of said audio mixer, said signal varying means being connected between said audio mixer and said ground potential.

15. The write control circuit of claim 13, wherein said muting means and said path control means comprise a first transistor and a second transistor, respectively.

16. The write control circuit of claim 15, wherein each of said first transistor and said second transistor is coupled to a respective protecting means for protecting against excess current.

17. The write control circuit of claim 15, wherein said path control means comprises a second transistor for converting the output signal of said mode switch to an input signal of said first transistor.

18. The write control circuit of claim 16, wherein said path control means comprises a third transistor for converting the output signal of said mode switch to an input signal of said first transistor.

* * * * *